US008544516B2

(12) United States Patent
Mariman et al.

(10) Patent No.: US 8,544,516 B2
(45) Date of Patent: Oct. 1, 2013

(54) AGRICULTURAL IMPLEMENT WITH GAUGE WHEEL FOR A ROW UNIT

(75) Inventors: Nathan A. Mariman, Geneseso, IL (US); Polina Aronova, Port Byron, IL (US); Scott Cassidy, DeForest, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/591,926

(22) Filed: Aug. 22, 2012

(65) Prior Publication Data
US 2013/0032069 A1    Feb. 7, 2013

Related U.S. Application Data

(62) Division of application No. 12/419,502, filed on Apr. 7, 2009.

(51) Int. Cl.
*B60C 5/04* (2006.01)
*B60B 9/22* (2006.01)
*B60B 23/08* (2006.01)

(52) U.S. Cl.
USPC ........... 152/500; 152/501; 152/511; 152/512; 152/375; 111/135; 111/926; 111/927

(58) Field of Classification Search
USPC ............. 301/64.101, 64.201, 64.202, 64.301, 301/64.302, 64.304, 64.305, 64.306, 6.3, 301/63.301, 63.302, 64.303, 5.301, 5.7, 5.304, 301/5.305, 5.306, 5.307, 5.309, 95.101, 95.104, 301/95.105, 95.1, 99, 100, 101; 152/382, 152/393–398, 323, 450, 500, 501, 510–513, 152/383, 379.3, 375; 295/1, 15, 21, 22; 111/926, 6–66, 134–137, 927
See application file for complete search history.

(56) References Cited

U.S. PATENT DOCUMENTS

| 2,709,471 | A | 5/1955 | Smith et al. |
| 2,882,950 | A | 4/1959 | Grove |
| 4,071,386 | A | 1/1978 | Gomberg |
| 4,440,208 | A | 4/1984 | Trickel et al. |
| 4,733,730 | A | 3/1988 | Murray |
| 5,579,818 | A | 12/1996 | Hoppenheit et al. |
| 5,802,995 | A | 9/1998 | Baugher et al. |
| 6,314,897 | B1 | 11/2001 | Hagny |
| 6,572,198 | B1 | 6/2003 | Lai |
| 6,585,185 | B1 | 7/2003 | Weiss et al. |
| 6,935,667 | B2 | 8/2005 | Bradley et al. |
| 2005/0205181 | A1 | 9/2005 | Forney, III et al. |

FOREIGN PATENT DOCUMENTS

JP    03023912 A    1/1991

OTHER PUBLICATIONS

European Search Report received Aug. 18, 2010 (7 pages).

*Primary Examiner* — Christopher J Novosad

(57) ABSTRACT

An agricultural implement includes a tool bar and at least one row unit carried by the tool bar. Each row unit includes a furrow opener arrangement with a gauge wheel. The gauge wheel includes a rim with an outer periphery and a tire mounted to the outer periphery. The tire includes an outer shell formed from a first resilient material and an inner core formed from a softer second resilient material. The outer shell is positioned radially outward from the inner core and axial outward from axial ends of the inner core. The inner core is mounted directly on the outer periphery of the rim and defines an annular hollow core therein. The tire is structured and arranged such that the softer inner core, the annular hollow core and the harder outer shell coact to provide good wear, good shock absorbance, and good mud shedding capabilities.

11 Claims, 3 Drawing Sheets

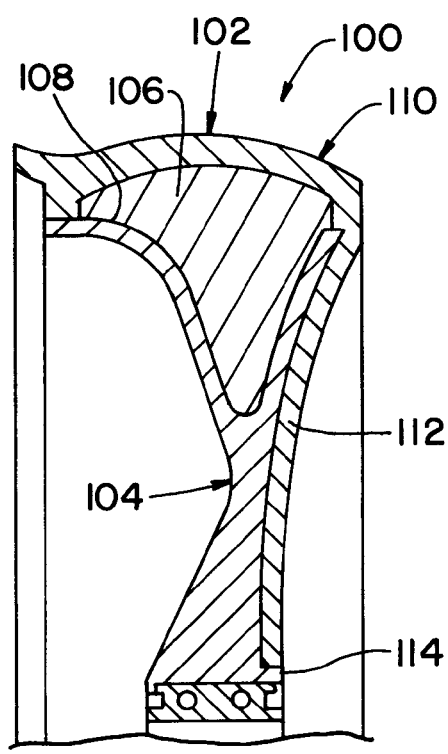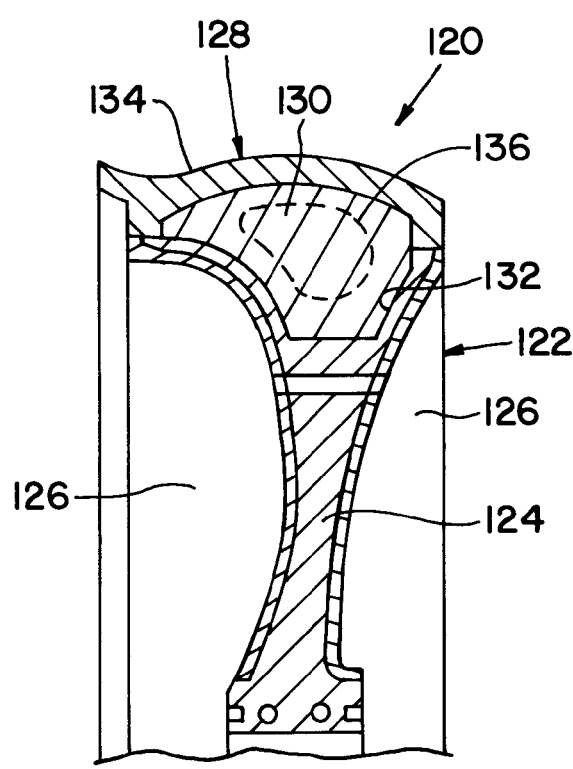
Fig. 7
Fig. 8

AGRICULTURAL IMPLEMENT WITH GAUGE WHEEL FOR A ROW UNIT

This is a division of U.S. patent application Ser. No. 12/419,502, entitled "GAUGE WHEEL FOR AN AGRICULTURAL IMPLEMENT", filed Apr. 7, 2009, which is incorporated herein by reference.

FIELD OF THE INVENTION

The present invention relates to agricultural seeders, and, more particularly, to furrow opener arrangements for such seeders.

BACKGROUND OF THE INVENTION

An agricultural seeder such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper, insecticide hopper, furrow opener arrangement, furrow closer arrangement, etc.

One type of furrow opener arrangement uses a depth gauge wheel which is placed adjacent to the leading edge of a single disc opener assembly including a seed tube on the trailing side of the disc. The gauge wheel provides depth adjustment, cleans the leading face of the disc, and limits soil lifting and throw adjacent the disc opener.

Gauge wheels are typically manufactured with a rubber tire which is mounted to the outer periphery of a multi-piece, clam shell type rim. The outer radial periphery of each clam shell half of the rim is flared and the tire is sandwiched therebetween. Fasteners such as bolts or rivets are then used to bolt the clam shell halves of the rim together.

A gauge wheel as described above is part of an effective furrow opener arrangement. However, the multi-piece clam shell arrangement makes the gauge wheel more time consuming and costly to manufacture. Moreover, the rubber tire compromises between wear resistance and shock absorbance. If the rubber is too hard, it will not absorb shock sufficiently when traveling over uneven or rough ground. If the rubber is too soft, it will wear prematurely when traveling over stubbly fodder present in no-till field environments.

What is needed in the art is a furrow opener arrangement with a gauge wheel which is easier and cheaper to manufacture, has good wear characteristics, and good shock absorbing characteristics.

SUMMARY OF THE INVENTION

The invention in one form is directed to an agricultural implement, including a tool bar and at least one row unit carried by the tool bar. Each row unit includes a furrow opener arrangement with a gauge wheel. The gauge wheel includes a rim with an outer periphery and a tire mounted to the outer periphery. The tire includes an outer shell formed from a first resilient material and an inner core formed from a second resilient material. The first resilient material is harder than the second resilient material. The outer shell is positioned radially outward from the inner core and axial outward from axial ends of the inner core, whereby the inner core is encased entirely within the outer shell and the rim. The inner core is mounted directly on the outer periphery of the rim and defines an annular hollow core therein with an absence of an inflatable tube. The tire is structured and arranged such that the softer inner core, the annular hollow core and the harder outer shell coact to provide good wear, good shock absorbance, and good mud shedding capabilities.

BRIEF DESCRIPTION OF THE DRAWINGS

FIG. 7 is a side, sectional view of another embodiment of a gauge wheel of the present invention; and FIG. 8 is a side, sectional view of another embodiment of a gauge wheel of the present invention.

DETAILED DESCRIPTION OF THE INVENTION

Figure 1:
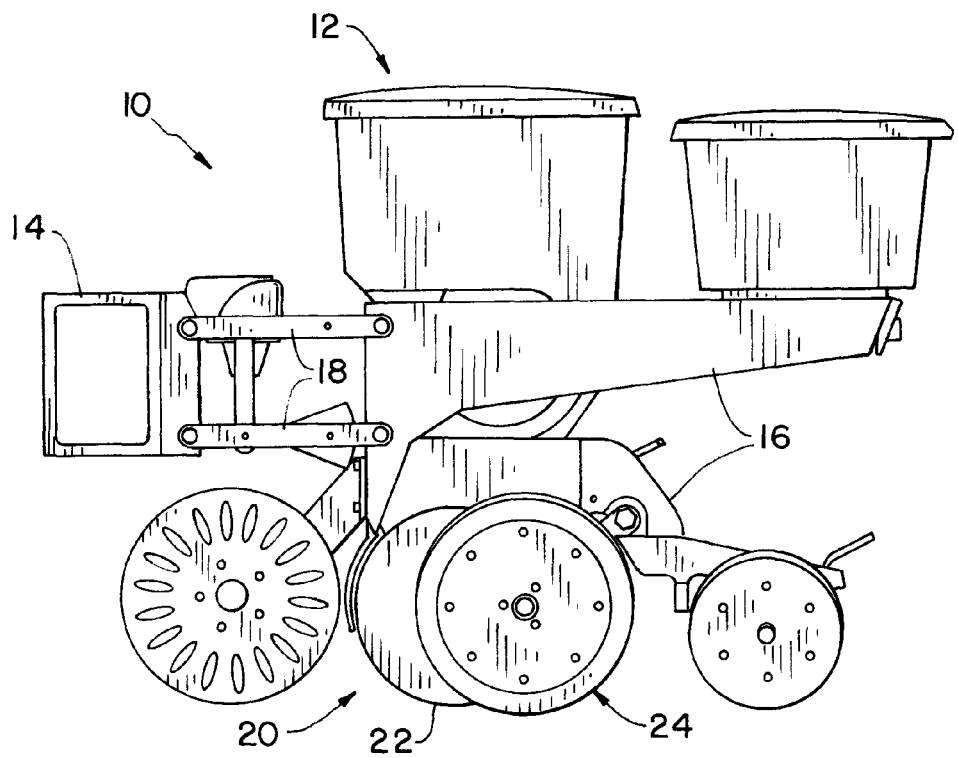
FIG. 1 is a side view of an agricultural seeder including a row crop unit with an embodiment of a gauge wheel of the present invention.

Referring now to the drawings, and more particularly to FIG. 1, there is shown an embodiment of an agricultural seeder 10 of the present invention. In the embodiment shown, seeder 10 is in the form of a row crop planter but may also be in the form of a grain drill, etc. FIG. 1 illustrates a single row crop unit 12 of a multi-row planter, with each row crop unit 12 being substantially identical and connected to a common tool bar 14. Only a single row crop unit 12 is shown for simplicity sake.

Row crop unit 12 includes a frame 16 which is attached to tool bar 14 by parallel linkage 18. Tool bar 14 is coupled to a traction unit (not shown), such as an agricultural tractor. For example, tool bar 14 may be coupled to an agricultural tractor using a 3-point hitch assembly. Tool bar 14 may be coupled with transport wheel assemblies, marker arms, etc. which may be of conventional design and not shown for simplicity sake. The transport wheels, in known manner, may provide ground drive to row crop unit 12 through the use of shafts, chains, sprockets, transfer cases, etc. Frame 16 carries an opener arrangement 20 for forming a seed trench in soil. Opener arrangement 20 includes a disc opener 22 and an adjacent gauge wheel 24. Gauge wheel 24 is pivotally coupled with frame 16 by an arm (not specifically shown). Gauge wheel 24 may be vertically adjusted to adjust the depth of the trench which is cut into the soil using disc opener 22.

Figure 2:
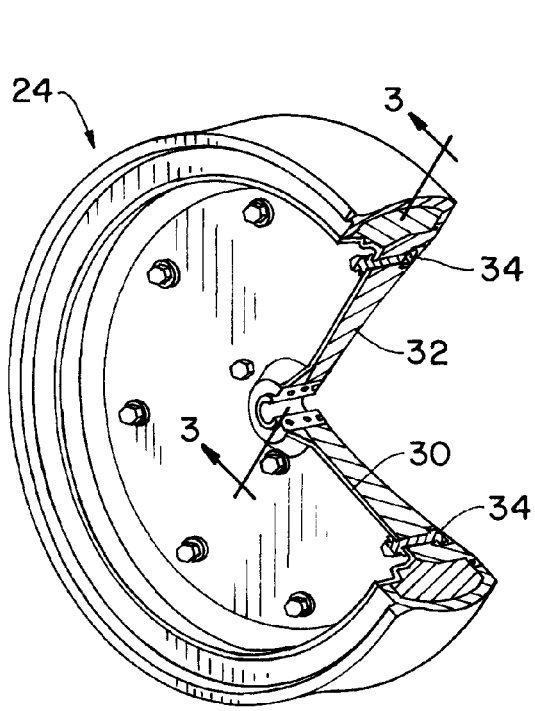
FIG. 2 is a perspective, partially fragmentary view of the gauge wheel shown in FIG. 1.
Figure 3:
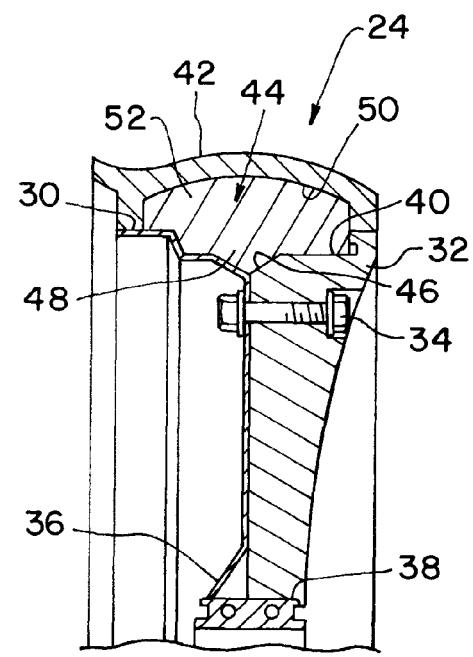
FIG. 3 is a side sectional view of the gauge wheel shown in FIGS. 1 and 2, taken along line 3-3 in FIG. 2.

Gauge wheel 24 generally includes a rim 26 and a tire 28 (FIGS. 2 and 3). In the illustrated embodiment, rim 26 has a clamshell construction with a first clamshell half 30 and a second clamshell half 32 which are joined together using fasteners such as bolts 34. At the radially inboard end, first clamshell half 30 and second clamshell half 32 define a hub 36 which carries a steel bushing 38. Steel bushing 38 is sized and configured to receive a bearing, which in turn is mounted to an axle shaft (not shown). At the radially outboard end, first clamshell half 30 and second clamshell half 32 define an outer periphery 40 of rim 26. Tire 28 is mounted to outer periphery 40.

Tire 28 includes an outer shell 42 and an inner core 44. Outer shell 42 is constructed from a material which is adapted to provide good wear of tire 28 when traveling over stubbly ground, such as may occur in no till soil conditions. Inner core 44 is constructed from a materia which is adapted to cushion and absorb impact loads, and to flex to an extent such that tire 28 can shed mud during operation. More particularly, outer shell 42 is formed from a first resilient material and inner core 44 is formed from a different second resilient material. The first resilient material making up outer shell 42 is harder than the second resilient material making up inner core 44. In the illustrated embodiment, the first resilient material has a durometer rating of between 80-100 durometer (preferably approximately 90 durometer), and the second resilient material making up inner core 44 has a durometer rating of between 20-40 durometer. In one embodiment, the first resilient material making up outer shell 42 is constructed from a first urethane material and the second resilient material making up inner core 44 is formed from a different second urethane material.

To hold tire 28 in place on rim 26 during operation, the outer periphery 40 of rim 26 includes a first keying feature 46 in the form of an annular recess. Inner core 44 likewise includes a second keying feature in the form of an annular projection 48 which is positioned within annular recess 46. Annular recess 46 and annular projection 48 coact with each other to hold tire 28 in position on the outer periphery 40 of rim 26 during operation of gauge wheel 24.

Similarly, to retain outer shell 42 on inner core 44, outer shell 42 has a radially inner surface defining a second anular recess 50. Inner core 44 includes a second annular projection 52, opposite annular projection 48, which fits into second annular recess 50. Inner core 44 is thus positioned partially within each of the first annular recess 46 and second annular recess 50.

With reference to the remaining figures, other embodiments of gauge wheels of the present invention will be described in greater detail hereinafter. For each embodiment, it is to be understood that the gauge wheel includes a tire with an inner core and an outer shell, each made from different resilient materials, with the inner core being softer than the outer shell. The construction of the tire in this manner provides good wear, good shock absorbance, and good mud shedding capabilities.

Figure 4:
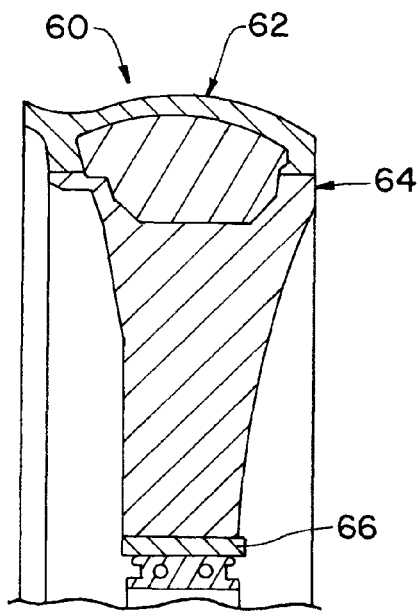
FIG. 4 is a side, sectional view of another embodiment of a gauge wheel of the present invention.

Referring now to FIG. 4, there is shown another embodiment of a gauge wheel 60 of the present invention. Tire 62 is constructed generally the same as tire 28 shown in FIGS. 1-3. However, rim 64 is constructed as a one piece molded part with a steel bushing 66 for retaining a bearing associated with an axle shaft. Rim 64 is thus constructed as an integral and monolithic rim which carries tire 62 and steel bushing 66. Rim 64 is preferably constructed as a rigid, molded plastic part, but could also be constructed from machined or molded metal such as aluminum.

Figure 5:
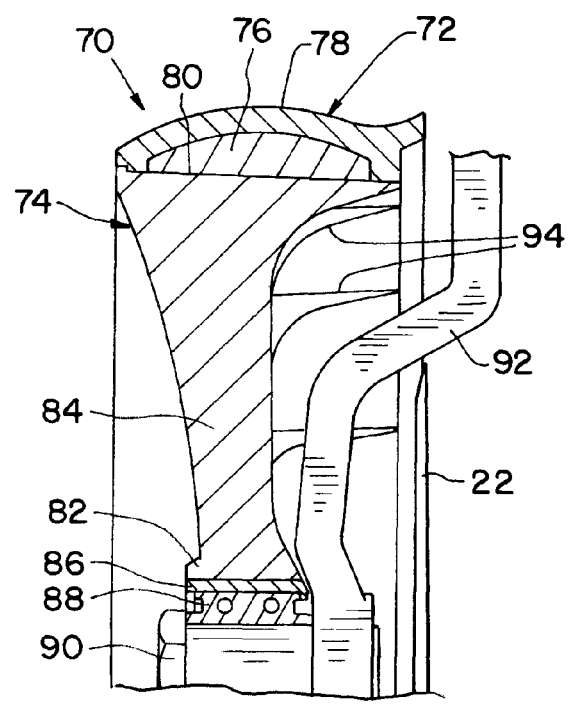
FIG. 5 is a side, sectional view of another embodiment of a gauge wheel of the present invention.
Figure 6:
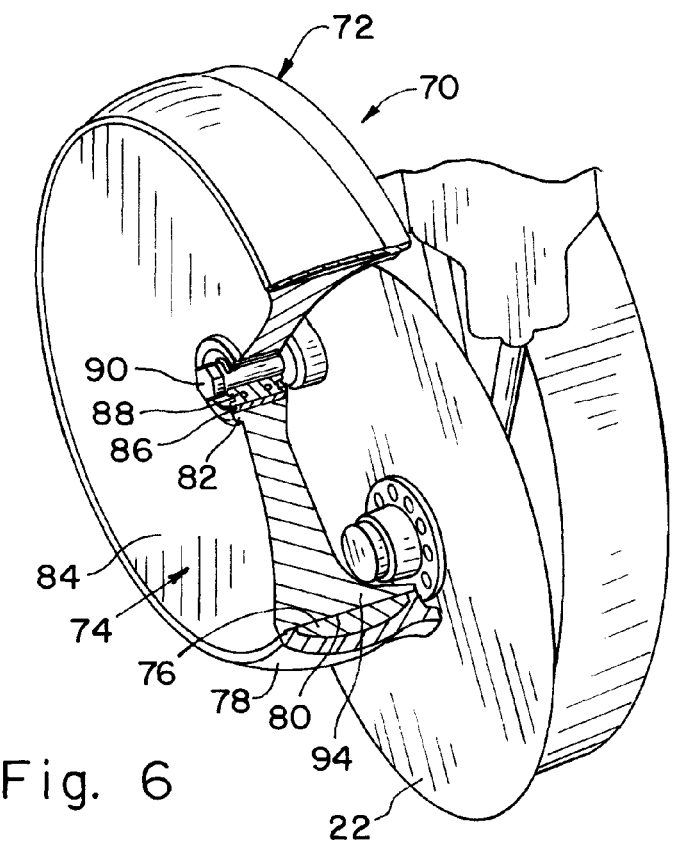
FIG. 6 is a perspective, sectional view of the gauge wheel shown in FIG. 5.

Referring now to FIGS. 5 and 6, there is shown another embodiment of a gauge wheel 70 of the present invention. Gauge wheel 70 includes a tire 72 which is mounted to a rim 74. Tire 72 includes an inner core 76 and an outer shell 78, as do gauge wheels 24 and 60 shown in FIGS. 1-3 and 4 above. However, tire 72 is not held in place relative to rim 74 using keying between inner core 76 and the outer periphery 80 of rim 74. Referring to FIG. 5, it is evident that the outer periphery 80 of rim 74 is generally flat in the area adjacent to inner core 76. On the other hand, it is also evident that outer periphery 80 has a stepped shoulder on the left side where it engages with and keys to outer shell 78 of tire 72.

As with the embodiment of gauge wheel 60 shown in FIG. 4, gauge wheel 70 also has a one piece rim with a hub 82, radially extending web 84, and outer periphery 80 which are integrally and monolithically constructed together. A steel bushing 86 carries a bearing 88 and axle shaft 90, which in turn is mounted to an arm 92 mounted to the frame of the row crop unit. Web 84 also includes curved, axially extending reinforcing ribs 94 which terminate along an outer edge of outer periphery 80.

Referring now to FIG. 7, there is shown another embodiment of a gauge wheel 100 of the present invention. Gauge wheel 100 includes a tire 102 which is mounted to a one piece rim 104. Tire 102 has an inner core 106 which is keyed to the outer periphery 108 of rim 104. Tire 102 also has an outer shell 110 with a radially inwardly extending wall 112 which terminates adjacent to the outside diameter of hub 114.

Referring now to FIG. 8, another embodiment of a gauge wheel 120 of the present invention is shown. In this embodiment, rim 122 has a metal core 124, such as aluminum, over which is molded on opposite axial sides, a glass-filled nylon or other plastic shell 126. Tire 128 includes an inner core 130 which is keyed to the outer periphery 132 of rim 122. Inner core 130 may be injection molded into the space between outer periphery 132 and outer shell 134 using a urethane with a foaming agent.

As shown in FIG. 8, gauge wheel 120 can be formed with an inner core 130 which is partially hollow or cored out. For example, a portion of the cross sectional area of inner core 130 can be optionally cored out as shown by dashed line 136. It will be appreciated that the cored out area has an annular shape extending around gauge wheel 120, within inner core 130. Of course, any of the inner cores shown in the other embodiments can also be partially cored out. Such a cored out area within the inner core may provide desirable load damping characteristics and mud shedding.

In the embodiments shown, the gauge wheel is used in conjunction with an agricultural seeder in the form of a row crop planter. However, it is also to be understood that the gauge wheel may also be used for other applications, such as a wheel for a fertilizer applicator, mower, etc.

Having described the preferred embodiment, it will become apparent that various modifications can be made without departing from the scope of the invention as defined in the accompanying claims.

The invention claimed is:

1. An agricultural implement, comprising:
    a tool bar; and
    at least one row unit carried by said tool bar, each said row unit including a furrow opener arrangement with a gauge wheel, said gauge wheel including:
        a rim having an outer periphery; and
        a tire mounted to said outer periphery, said tire including an outer shell formed from a first resilient material having a treadless outer surface and an inner core formed from a second resilient material, said first resilient material being harder than said second resilient material, said outer shell being positioned radially outward from said inner core and axially outward from axial ends of said inner core, whereby said inner core is encased entirely within said outer shell and said rim, said inner core being mounted directly on said outer periphery of said rim and defining an annular hollow core enclosed therein spaced from said rim and from said outer shell with an absence of an inflatable tube, whereby said tire is structured and arranged such that said softer inner core, said annular hollow core and said harder outer shell coact to provide wear, shock absorbance, and mud shedding capabilities.

2. The agricultural implement of claim 1, wherein said first resilient material has a durometer rating of between 80 to 100 durometer, and said second resilient material has a durometer rating of between 20 to 40 durometer.

3. The agricultural implement of claim 2, wherein said first resilient material has a durometer rating of approximately 90 durometer.

4. The agricultural implement of claim 2, wherein said first resilient material is a first urethane material, and said second resilient material is a different second urethane material.

5. The agricultural implement of claim 1, wherein said outer periphery of said rim includes a first keying feature, and one of said outer shell and said inner core includes a second keying feature, said first keying feature and said second keying feature coacting to hold said tire on said outer periphery of said rim during operation of said gauge wheel.

6. The agricultural implement of claim 5, wherein said first keying feature is a recess in said outer periphery of said rim, said second keying feature is a projection from said inner core which is positioned within said recess.

7. The agricultural implement of claim 1, wherein said rim has a hub and a web extending radially outward from said hub to said outer periphery, said outer periphery including a first annular recess and said outer shell of said tire including a second annular recess, said inner core positioned partially within each of said first annular recess and said second annular recess.

8. The agricultural implement of claim 1, wherein said rim has a hub and a web extending radially outward from said hub to said outer periphery.

9. The agricultural implement of claim 8, including a steel bushing within said hub.

10. The agricultural implement of claim 8, wherein said rim is constructed from one of machined metal and molded plastic.

11. The agricultural implement of claim 1, wherein said agricultural implement is an agricultural seeder.

* * * * *